(12) United States Patent
Yu et al.

(10) Patent No.: US 9,875,294 B2
(45) Date of Patent: Jan. 23, 2018

(54) METHOD AND APPARATUS FOR CLASSIFYING OBJECT BASED ON SOCIAL NETWORKING SERVICE, AND STORAGE MEDIUM

(71) Applicant: TENCENT TECHNOLOGY (SHENZHEN) COMPANY LIMITED, Shenzhen (CN)

(72) Inventors: Jianxing Yu, Shenzhen (CN); Lingling Yi, Shenzhen (CN); Peng He, Shenzhen (CN); Chuan Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/112,491

(22) PCT Filed: Apr. 28, 2015

(86) PCT No.: PCT/CN2015/077641
§ 371 (c)(1),
(2) Date: Jul. 19, 2016

(87) PCT Pub. No.: WO2015/165372
PCT Pub. Date: Nov. 5, 2015

(65) Prior Publication Data
US 2016/0357845 A1 Dec. 8, 2016

(30) Foreign Application Priority Data
Apr. 29, 2014 (CN) .......................... 2014 1 0177246

(51) Int. Cl.
*G06F 17/30* (2006.01)
*G06Q 50/00* (2012.01)
(Continued)

(52) U.S. Cl.
CPC ........ *G06F 17/30598* (2013.01); *G06F 17/16* (2013.01); *G06F 17/18* (2013.01);
(Continued)

(58) Field of Classification Search
None
See application file for complete search history.

(56) References Cited

U.S. PATENT DOCUMENTS

2011/0072052 A1* 3/2011 Skarin .................... G06Q 10/10
707/794

FOREIGN PATENT DOCUMENTS

| CN | 102123172 A | 7/2011 |
|----|-------------|--------|
| CN | 102542063 A | 7/2012 |

(Continued)

OTHER PUBLICATIONS

International Search Report and Written Opinion, International Application No. PCT/CN2015/077641, dated Jun. 30, 2015.
(Continued)

*Primary Examiner* — Alan Chen
(74) *Attorney, Agent, or Firm* — Marshall, Gerstein & Borun LLP (57) ABSTRACT

Described are a method and an apparatus for classifying an object based on a social networking service. Feature information of an object may be acquired; a semantic vector of the feature information may be computed, the semantic vector being used to reflect a relevancy feature when segmented words exist in the feature information simultaneously; and the semantic vector of the feature information of the object may be input to a predetermined classifier, to obtain an initial category of the object after the object is classified.

15 Claims, 5 Drawing Sheets

(51) Int. Cl.
 *G06F 17/27* (2006.01)
 *G06F 17/16* (2006.01)
 *G06F 17/18* (2006.01)

(52) U.S. Cl.
 CPC .... *G06F 17/2785* (2013.01); *G06F 17/30958* (2013.01); *G06Q 50/01* (2013.01)

(56) References Cited

FOREIGN PATENT DOCUMENTS

CN 103150335 A 6/2013
WO WO-2010/014082 A1 2/2010

OTHER PUBLICATIONS

Search Report in EP Application No. 15786331.7 dated Jan. 5, 2017, 6 pages.

\* cited by examiner

METHOD AND APPARATUS FOR CLASSIFYING OBJECT BASED ON SOCIAL NETWORKING SERVICE, AND STORAGE MEDIUM

FIELD OF THE TECHNOLOGY

The present disclosure relates to the field of computer technologies, and in particular, to a method and an apparatus for classifying an object based on a social networking service, and a storage medium.

BACKGROUND OF THE DISCLOSURE

A social networking service usually has a large user group, and users communicate with each other and share things with each other, and therefore, many groups are formed. Because different users have different interests, groups formed by them have different preferences, such as a "basketball" group, a "housing estate" group, and a "yoga" group. It is quite difficult for a user to find, from massive data, a user having a similar interest or a group having a similar preference. Therefore, a clustering method that can automatically categorize users having a same interest or groups having a similar topic is needed.

In a traditional clustering method for categorizing users or groups, each piece of user information or group information is represented as a space vector by using a 0/1 representation method (that is, for feature information corresponding to each piece of user information or group information, if a segmented word exists in the feature information, a corresponding vector value used for representing the segmented word is set to 1; otherwise, a vector value used for representing the segmented word is set to 0), where a dimension of the space vector is the total number of words in all features; then, clustering analysis is performed based on the space vector of the feature information by using a Vector Space Model (VSM) of a classifier.

Because there are hundreds of millions of pieces of user information and group information, and a dimension of a space vector is very large, time complexity and space complexity in computation is very large, and even the processing efficiency and performance of the VSM may be severely affected.

SUMMARY

Embodiments of the present invention provide a method and an apparatus for classifying an object based on a social networking service. The technical solutions are as follows.

A method for classifying an object based on a social networking service is provided, the method being run in a computing device, and the computing device including a storage apparatus, one or more processors, and a program instruction stored in the storage apparatus and executed by the one or more processors, the method including: acquiring feature information of an object, the feature information including multiple segmented words; computing a semantic vector of the feature information, the semantic vector being used to reflect a relevancy feature when the segmented words exist in the feature information simultaneously; and inputting the semantic vector of the feature information of the object to a predetermined classifier, to obtain an initial category of the object after the object is classified.

An apparatus for classifying an object based on a social networking service is provided, and includes: a storage apparatus, one or more processors, one or more program modules stored in the storage apparatus and executed by the one or more processors, and the one or more program modules including: a first acquisition module, configured to acquire feature information of an object, the feature information including multiple segmented words; a logical operation module, configured to compute a semantic vector of the feature information, the semantic vector is used to reflect a relevancy feature when the segmented words exist in the feature information simultaneously; and a classifying module, configured to input the semantic vector of the feature information of the object to a predetermined classifier, to obtain an initial category of the object after the object is classified.

A non-transitory computer readable storage medium is provided, storing program instructions executable by a computing device, and when the executable instructions are run in the computing device, a method for classifying an object based on a social networking service being executed, the method including: acquiring feature information of an object, the feature information including multiple segmented words; computing a semantic vector of the feature information, the semantic vector being used to reflect a relevancy feature when the segmented words exist in the feature information simultaneously; and inputting the semantic vector of the feature information of the object to a predetermined classifier, to obtain an initial category of the object after the object is classified.

Feature information of an object is represented as a semantic vector, and the semantic vector is input to a predetermined classifier, to obtain an initial category of the object after the object is classified, which solve a problem that, because there are hundreds of millions of pieces of user information and group information, and a dimension of a space vector is very large, time complexity and space complexity in computation is very large, and even the processing efficiency and performance of a VSM may be severely affected. Because a semantic vector is a vector used to reflect a relevancy feature when segmented words exist in the feature information simultaneously, a dimension of the semantic vector is far less than a dimension of a space vector, thereby achieving an effect of greatly reducing computation complexity, and improving the processing efficiency and performance of the VSM.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and a person of ordinary skill in the art may still derive other drawings from the accompanying drawings without creative efforts.

DESCRIPTION OF EMBODIMENTS

In order to make the objectives, technical solutions and advantages of the present disclosure clearer, the embodiments of the present invention are described in detail in the following with reference to the accompanying drawings.

Figure 1:
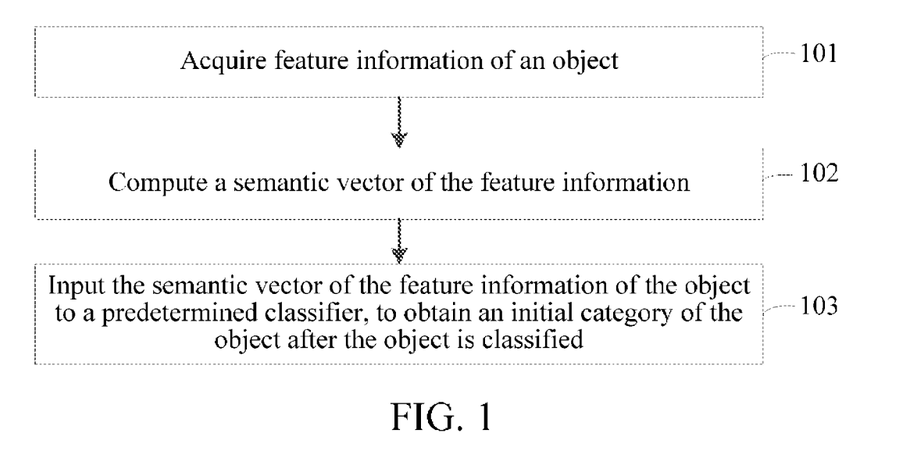
FIG. 1 is a flowchart of a method for classifying an object based on a social networking service according to an embodiment of the present invention.

Refer to FIG. 1, which is a flowchart of a method for classifying an object based on a social networking service according to an embodiment of the present invention. The method for classifying an object based on a social networking service may be applied in a server or another device needing to perform classification. The method for classifying an object based on a social networking service may include:

101: Acquire feature information of an object.

102: Compute a semantic vector of the feature information, the semantic vector being used to reflect a relevancy feature when segmented words exist in the feature information simultaneously.

103: Input the semantic vector of the feature information of the object to a predetermined classifier, to obtain an initial category of the object after the object is classified.

Figure 2A:
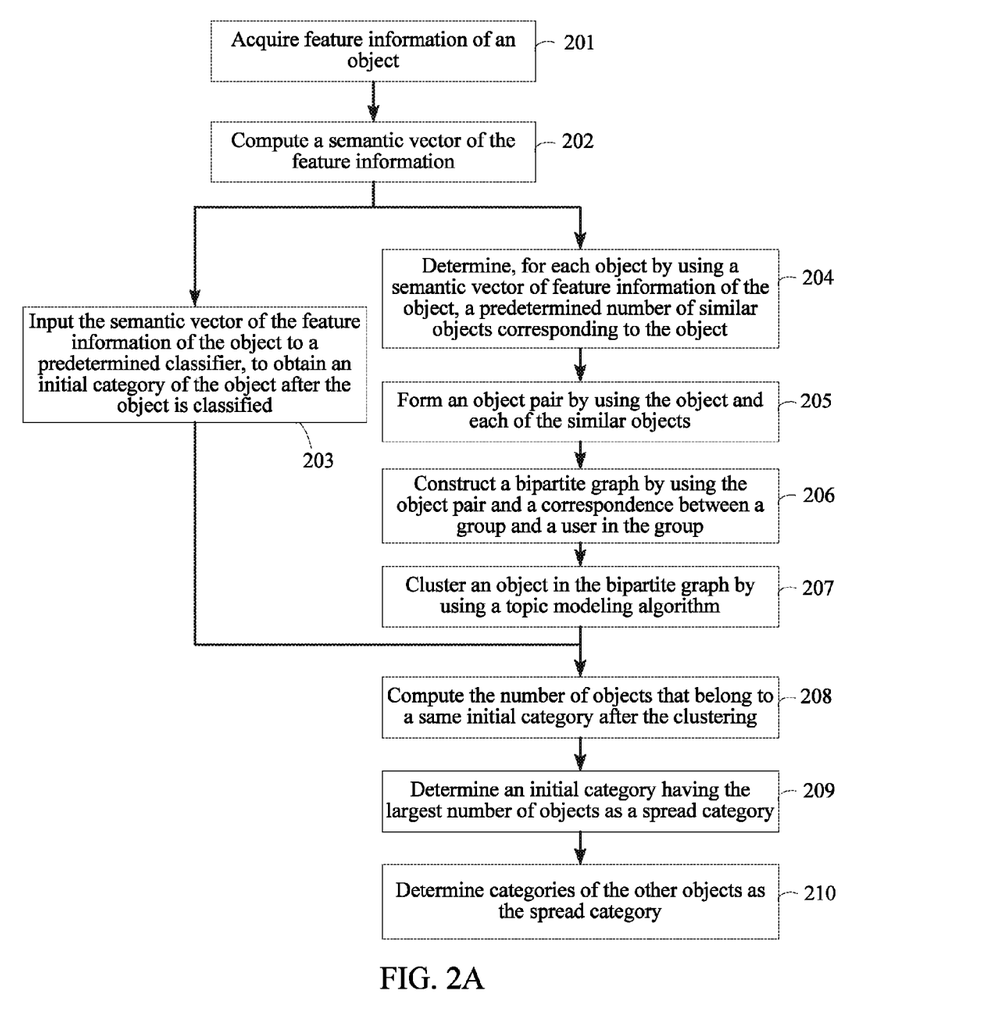
FIG. 2A is a flowchart of a method for classifying an object based on a social networking service according to another embodiment of the present invention.

Referring to FIG. 2A, which is a flowchart of a method for classifying an object based on a social networking service according to another embodiment of the present invention. The method for classifying an object based on a social networking service may be applied in a server or another device needing to perform classification. The method for classifying an object based on a social networking service may include:

201: Acquire feature information of an object.

The object described herein may include a user and/or a group. Generally, a group may include multiple users, one user may join multiple groups simultaneously, or may not join any group.

When the object is a user, the feature information of the object may be user information, which may include a user name, interest information of the user, status posted by the user, a log posted by the user, and the like. The feature information may include text information and/or non-text information.

When the object is a group, the feature information of the object may be group information, which, for example, may include a group name and the like.

202: Compute a semantic vector of the feature information.

The semantic vector may be used to reflect a relevancy feature when segmented words exist in the feature information simultaneously. Generally, the semantic vector is a representation in a continuous vector space that is found for each segmented word by using a predetermined mathematical model, and considering a context, a frequency at which the segmented words exist in a same context is used to reflect a relevancy feature of the segmented words. That is, a semantic vector of the feature information may cover context information of the feature information.

Because the semantic vector may cover the context information of the feature information, a dimension of the semantic vector may be reduced to a very small dimension, for example, may be 200 dimensions.

Figure 2B:
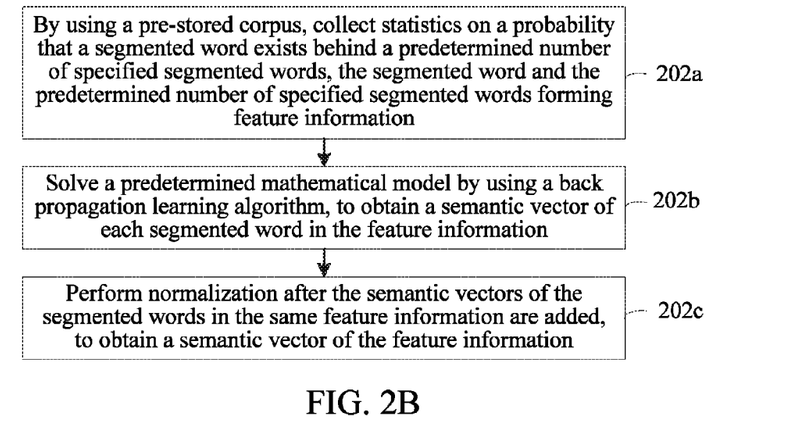
FIG. 2B is a schematic flowchart of a method for computing a semantic vector of feature information according to an embodiment of the present invention.

Refer to FIG. 2B, which is schematic flowchart of a method for computing a semantic vector of feature information according to this embodiment of the present invention. The method includes:

202a: By using a pre-stored corpus, collect statistics on a probability that a segmented word exists behind a predetermined number of specified segmented words, the segmented word and the predetermined number of specified segmented words forming feature information.

The corpus includes various feature information, and the feature information in the corpus have many sources, for example, a server may acquire various feature information from another server, or a user may also upload feature information to the server.

For example, in various feature information in the corpus, when a segmented word is "University", statistics is collected on a probability that the segmented word exists behind "Beijing" and "Science and technology", where the feature information is "Beijing Science and Technology University".

202b: Solve a predetermined mathematical model by using a back propagation learning algorithm, to obtain a semantic vector of each segmented word in the feature information.

A formula of the predetermined mathematical model described herein is as follows:

$$y = \text{softmax}(U \cdot \tan h(Hx+d)+Wx+b),$$

where, y is a matrix formed by probabilities that the segmented word exists in pieces of feature information, x is a vector obtained by connecting semantic vectors of a predetermined number of specified segmented words in each piece of feature information in a head-to-tail manner, d and b are offset items, tan h and softmax are activation functions, U is a parameter from a hidden layer to an output layer of the predetermined mathematical model, and W is linear transformation from an input layer to the output layer of the predetermined mathematical model.

It should be noted that the data, which is from the hidden layer to the output layer, needs to be multiplied by the parameter U to the output layer. For example, if a value of one data in the hidden layer equals A, the data output to the output layer is equal to A*U.

In a practical application, the semantic vector needs to be capable of covering context information of a word, and in this case, a cosine value of semantic vectors corresponding to segmented words having similar semantics may be relatively large; therefore, the recognition effect is fine when feature information of the similarity is determined. Generally, a conditional probability may be used to reflect a context of a word, that is, a probability of each segmented word is only affected by segmented words that already exist previously, and the conditional probability is $P(w_i|w_1, \ldots, w_{i-1})$. To simplify the computation, that each segmented word is affected by n−1 segmented words (that is, a specified segmented word) before the segmented word is only considered, that is, $P(w_i|w_{i-n+1}, \ldots, w_{i-1})$. A good semantic vector can maximize a conditional probability $P(w_i|w_{i-n+1}, \ldots, w_{i-1})$ of each segmented word, and in this embodiment, a three-layer predetermined mathematical model may be used to optimize maximum and minimum values of the probability.

An input layer of the predetermined mathematical model is n−1 segmented words mentioned above, and each segmented word corresponds to one semantic vector, and the semantic vectors are respectively marked as $C(w_{i-n+1}), \ldots, C(w_{i-1})$, where a dimension of each vector is m. n−1 vectors are connected in a head-to-tail manner, to form a (n−1)m-dimension vector, marked as x. Then, a non-linear hidden layer is used to model x, that is, tan h(Hx+d). An output layer of the predetermined mathematical model is a |V|-dimension prediction result, where V is a set of all segmented words. U (that is, a |V|×h matrix, where h is the number of hidden layers) is a parameter from a hidden layer to an output layer; and w(a|V|×(n−1)m matrix) is linear transformation directly from an input layer to the output layer. The $i^{th}$ dimension $y_i$ of the prediction result y represents a probability that the next word is i, that is, $y_i = P(w_{i-n+1}, \ldots, w_{i-1})$.

For example, when a segmented word only exists behind a specified segmented word a1 and a specified segmented word a2 and behind a specified segmented word b1 and a specified segmented word b2, a probability that the segmented word exists behind the specified segmented word a1 and the specified segmented word a2 is y1, a probability that the segmented word exists behind the specified segmented word b1 and the specified segmented word b2 is y2, semantic vectors of the specified segmented word a1 and the segmented word a2 are $C_{a1}$ and $C_{a1}$, and semantic vectors of the specified segmented word b1 and the specified segmented word b2 respectively are $C_{b1}$ and $C_{b1}$, $$y = \begin{bmatrix} y_1 \\ y_2 \end{bmatrix}, x = \begin{bmatrix} C_{a1} & C_{a2} \\ C_{b1} & C_{b2} \end{bmatrix},$$

Then, the predetermined mathematical model may be:

$$\begin{bmatrix} y_1 \\ y_2 \end{bmatrix} = softmax\left(U \cdot \tanh\left(H\begin{bmatrix} C_{a1} & C_{a2} \\ C_{b1} & C_{b2} \end{bmatrix} + d\right) + W\begin{bmatrix} C_{a1} & C_{a2} \\ C_{b1} & C_{b2} \end{bmatrix} + b\right)$$

When a same segmented word exists in a large amount of feature information, a large number of equations may be formed, where a result y of the equation is known; therefore, solution is performed by combining the equations, and parameters in the foregoing predetermined mathematical model can be solved, where the parameters include a semantic vector C of each segmented word.

202c: Perform normalization after the semantic vectors of the segmented words in the same feature information are added, to obtain the semantic vector of the feature information.

For example, when the feature information is "Beijing Science and Technology University", according to step 202b, an obtained semantic vector of "Beijing" is [0.1 0.2 0.1 ... 0.4] (which, for example, is a 200-dimension vector), an obtained semantic vector of "Science and Technology" is [0.3 0.2 0.2 ... 0.1] (which also is a 200-dimension vector), and an obtained semantic vector of "University" is [0.2 0.1 0.4 ... 0.5] (which also is a 200-dimension vector); in this case, [0.1 0.2 0.1 ... 0.4]+[0.3 0.2 0.2 ... 0.1]+[0.2 0.1 0.4 ... 0.5]=[0.6 0.5 0.7 ... 1], the obtained vector is normalized to obtain [0.3 0.2 0.4 ... 0.5], and the vector [0.3 0.2 0.4 ... 0.5] obtained through normalization is used as a semantic vector of the feature information being "Beijing Science and Technology University".

203: Input the semantic vector of the feature information of the object to a predetermined classifier, to obtain an initial category of the object after the object is classified.

In a possible implementation manner, for a predetermined category, a seed word is selected for each category manually, for example, seed words of the finance category may include: "asset", "credit", "interest", and the like. The seed word of each category is represented as a semantic vector, and a predetermined classifier is obtained through training of the semantic vectors, for example, the classifier may be a support vector machine (SVM).

The semantic vector of the feature information of the object is input to the predetermined classifier, so that the initial category of the object after the object is classified may be obtained. For example, when a semantic vector of feature information of an object is input to the predetermined classifier, a value is obtained, and an interval, in which the value is located, corresponding to a category is determined, and the category corresponding to the interval is determined as the category of the object.

For example, when there are a category A, a category B, and a category C, where an output value corresponding to the category A is (0.2, 0.4), an output value corresponding to the category B is (0.4, 0.8), and an output value corresponding to the category C is (0.8, 0.95), after a semantic vector of feature information of an object is input to the predetermined classifier obtained after training, if a value output by the predetermined classifier is 0.56, it may be determined that a category of the object is the category B.

In a practical application, usually, the predetermined classifier may further obtain, at the same time, a confidence value obtained after the object is classified, that is, after the inputting the semantic vector of the feature information of the object to a predetermined classifier, to obtain an initial category of the object after the object is classified, the method may further include: acquiring a confidence value that is determined when the predetermined classifier classifies the object; and when the confidence value is greater than a predetermined confidence threshold, categorizing the object corresponding to the confidence value as the category determined by the classifier.

That is, when the confidence value is greater than the predetermined confidence threshold, it may be determined that the category as which the predetermined classifier classifies the object better conforms to a category that the object really belongs to; therefore, it may be determined that the object belongs to the category obtained through classification by the predetermined classifier. Obviously, when the confidence value is less than or equal to the predetermined confidence threshold, because the category as which the predetermined classifier classifies the object may not conform to the real category, the object may not be classified for the moment.

In a possible case, the category obtained through classification by the predetermined classifier may be marked as the initial category.

Figure 2C:
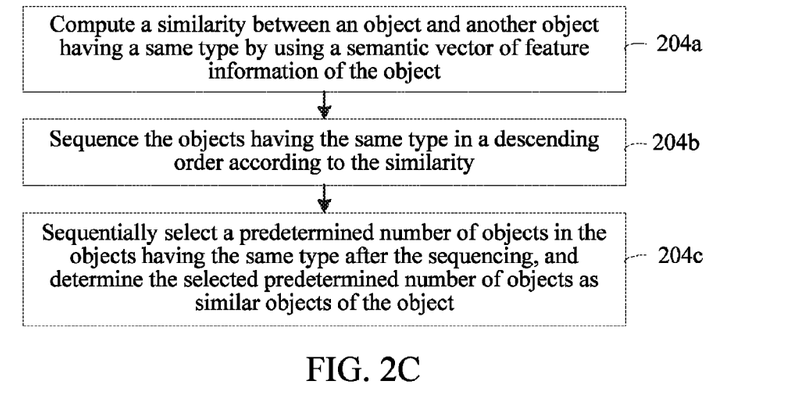
FIG. 2C is a schematic flowchart of a method for determining a predetermined number of similar objects corresponding to an object according to an embodiment of the present invention.

204: Determine, for each object by using a semantic vector of feature information of the object, a predetermined number of similar objects corresponding to the object;

Refer to FIG. 2C, which is a schematic flowchart of a method for determining a predetermined number of similar objects corresponding to an object according to this embodiment of the present invention. The determining, by using a semantic vector of feature information of an object, a predetermined number of similar objects corresponding to the object may include:

204a: Compute a similarity between the object and an object having a same type by using semantic vectors of feature information of the objects.

When the object is a user, a similarity between the user and another user needs to be computed; and when the object is a group, a similarity between the group and another group needs to be computed. That is, when a similarity between objects is computed, it is necessary that computation is performed on a similarity between objects having a same type.

In a possible implementation manner, when a server computes a similarity between an object and an object having a same type by using semantic vectors of feature information of the objects, the method may include: computing a cosine value between the semantic vector of the object and the semantic vector of the object having the same type; and determining the cosine value as the similarity.

Obviously, in a practical application, a similarity between two objects may also be obtained in another computation manner.

204b: Sequence objects having same type in a descending order according to the similarity.

204c: Sequentially select a predetermined number of objects from the objects having the same type after the sequencing, and determine the selected predetermined number of objects as similar objects of the object.

The predetermined number described herein may be set according to an actual situation, for example, may be 20, 30, or the like, which is not limited in this embodiment.

That is, when similarities between an object and objects having a same type are computed, an object having the same type and having the greatest similarity may be selected as a similar object of the object. For example, when the predetermined number is 3, similarities between an object P and objects having a same type, namely, p1, p2, p3, p4, and p5, are computed; if the similarities between the objects p1, p2, p3, p4, and p5 and the object P respectively are 0.3, 0.5, 0.6, 0.7, and 0.2, the objects having the same type are sequenced as: p4, p3, p2, p1, and p5, and p4, p3, and p2 are selected as similar objects of the object P.

205: Form an object pair by using the object and each of the similar objects.

That is, when similar objects of the object P is p4, p3, and p2, formed object pairs respectively are (P, p4), (P, p3), and (P, p2).

206: Construct a bipartite graph by using the object pair and a correspondence between a group and each user in the group.

Generally, to cluster, as far as possible, users or groups having a high similarity, during construction of a bipartite, a relationship between objects having a relative high similarity may be considered. That is, during construction of the bipartite, in addition to a relationship between a group and each user in the group, a relationship between users forming an object pair or a relationship between groups forming an object pair also needs to be considered.

Generally, the constructed bipartite graph at least includes a correspondence formed by a first element and a second element; and when the first element in the correspondence is a group, the second element is a user in the group or a group that is in a same object pair of the group; or, when the first element in the correspondence is a user, the second element is a user that is in a same object pair of the user.

Figure 2D:
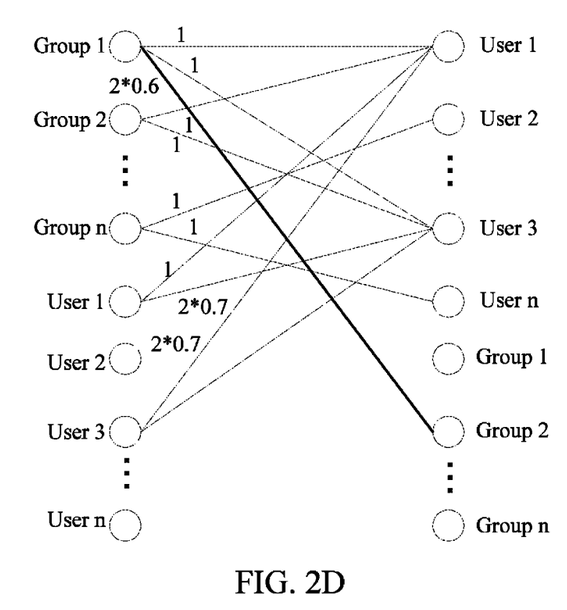
FIG. 2D is a schematic diagram of a bipartite graph according to an embodiment of the present invention.

Refer to FIG. 2D, which is a schematic diagram of a bipartite according to an embodiment of the present invention. During construction of a bipartite, a group is connected to users in the group, and two objects in an object pair are connected, that is, when an element at the left side of the bipartite (that is, a first element in a correspondence) is a group, related elements at the right side (that is, a second element in the correspondence) may be users in the group, or may be a group highly related (belonging to a same object pair) to the group; and when an element at the left side of the bipartite is a user, a related element at the right side may be a user that is in a same object pair of the user. For example, as can be seen from FIG. 2D, a group 1 includes a user 1 and a user 3, and the group 1 also forms an object pair with a group 2; a user 1 separately forms object pairs with a user 1 and a user 3. When a group is connected to a user, a weighted value corresponding to a connection side is 1; and when two objects in an object pair are connected, a weighted value corresponding to a connection side may be a weight * a similarity value between the two objects. For example, a user 3 and a user 1 form an object pair, a weighted value on a connection side between the user 3 and the user 1 is 2*0.7, where 2 is a weight, and 0.7 is a similarity value between the user 2 and the user 3. FIG. 2D only shows some connection lines, and connection lines between object pairs formed by left elements and right elements and connections line between a group and users in the group are not shown completely.

207: Cluster an object in the bipartite graph by using a topic modeling algorithm.

In a possible implementation manner, a bipartite graph may be represented as a matrix equivalently, where a line in the matrix is a first element in a correspondence, a column is a second element in the correspondence, and an element value at a cross of a line and a column is a weighted value of a connection side between the first element and the second element. Then, clustering is performed based on the matrix by using a topic modeling algorithm.

By using the topic modeling algorithm, groups having a cluster being group categories and users having a cluster being user categories may be obtained. The group category is a category corresponding to a group, and the user category is a category corresponding to a user. Groups having a cluster being a group category 1 includes a group 1, a group 2, and a group 5, and groups having a cluster being a group category 2 includes a group 3, a group 4, and a group 6; users having a cluster being a user category 1 includes a user 2, a user 4, a user 5, and a user 7, and users having a user category being a user category 2 include a user 1, a user 3, a user 6, and a user 8, and the like.

208: Compute the number of objects that belong to a same initial category after the clustering.

After the clustering, each cluster category may include many objects, and initial categories have been determined for these objects after step 203; and in this case, statistics may be collected on the number of objects, corresponding to each initial category, in the cluster category.

209: Determine an initial category having the largest number of objects as a spread category.

210: Determine categories of the other objects after the clustering as the spread category.

Obviously, in a possible implementation manner, a spread category may be added to categories of the other objects after the clustering, or categories of the other objects after the clustering may be replaced with spread categories.

For example, a cluster category is "basketball", the cluster category includes 20 groups, where initial categories of 16 groups are "basketball", initial categories of three groups are "volleyball", and an initial category of one group is "tennis". In this case, the initial category being "basketball" may be determined as a spread category. Then, the category being "basketball" is added to the category of the groups having an initial category being "volleyball" and the category of the group having an initial category being "tennis", or the category of the groups having an initial category being "volleyball" and the category of the group having an initial category being "tennis" are replaced with the category being "basketball".

Figure 3:
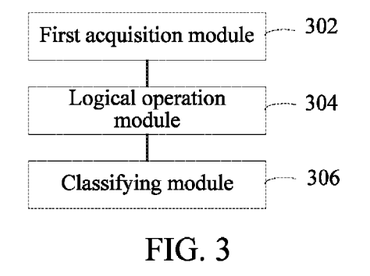
FIG. 3 is a schematic structural diagram of an apparatus for classifying an object based on a social networking service according to an embodiment of the present invention.

Refer to FIG. 3, which is a schematic structural diagram of an apparatus for classifying an object based on a social networking service according to an embodiment of the present invention. The apparatus for classifying an object based on a social networking service may be applied in a server or another device needing to perform classification. The apparatus for classifying an object based on a social networking service may include a first acquisition module 302, a logical operation module 304, and a classifying module 306.

The first acquisition module 302 may be configured to acquire feature information of an object.

The logical operation module 304 may be configured to compute a semantic vector of the feature information, the semantic vector being used to reflect a relevancy feature when segmented words exist in the feature information simultaneously.

The classifying module 306 may be configured to input the semantic vector of the feature information of the object to a predetermined classifier, to obtain an initial category of the object after the object is classified.

Figure 4:
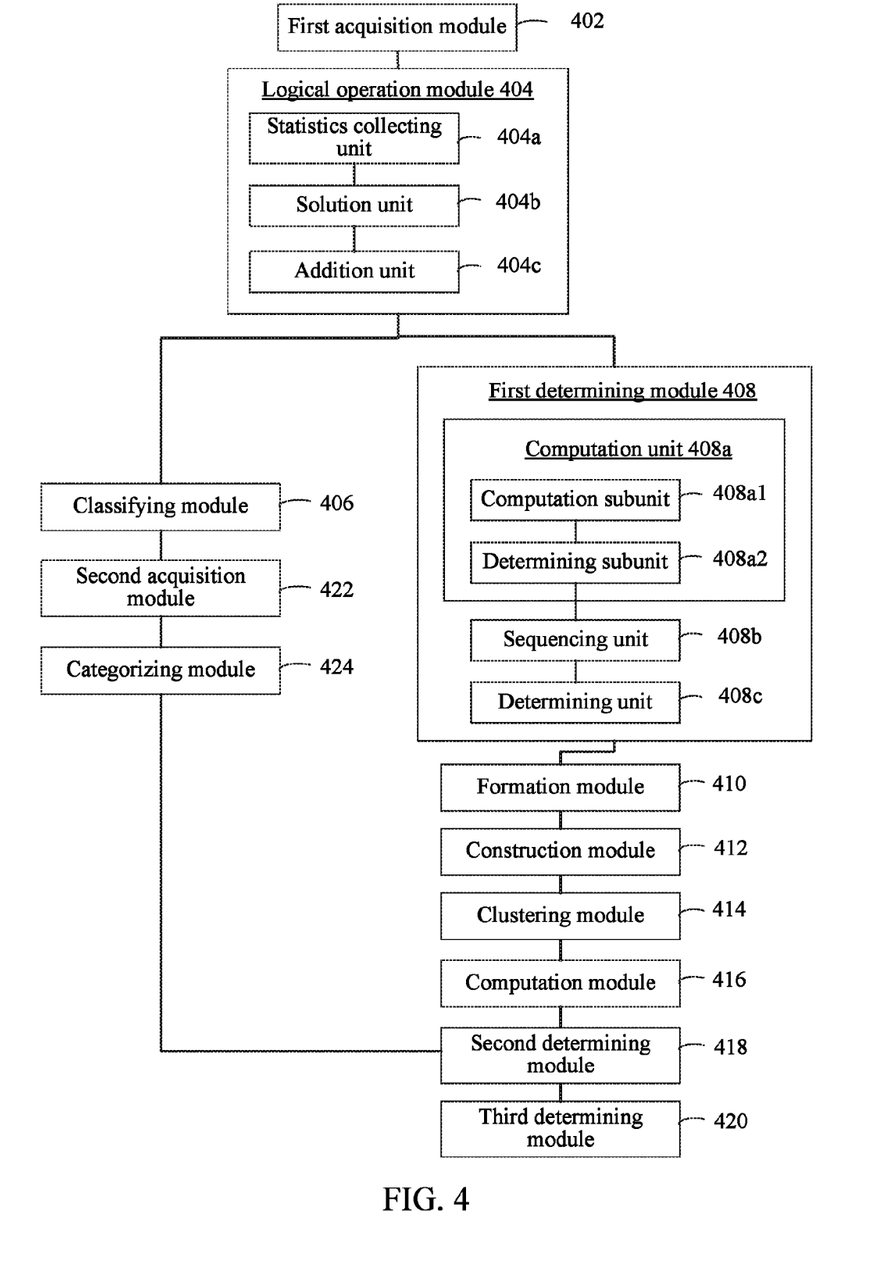
FIG. 4 is a schematic structural diagram of an apparatus for classifying an object based on a social networking service according to another embodiment of the present invention.

Refer to FIG. 4, which is a schematic structural diagram of an apparatus for classifying an object based on a social networking service according to another embodiment of the present invention. The apparatus for classifying an object based on a social networking service may be applied in a server or another device needing to perform classification. The apparatus for classifying an object based on a social networking service may include: a first acquisition module 402, a logical operation module 404, and a classifying module 406.

The first acquisition module 402 may be configured to acquire feature information of an object.

The logical operation module 404 may be configured to compute a semantic vector of the feature information, the semantic vector being used to reflect a relevancy feature when segmented words exist in the feature information simultaneously.

The classifying module 406 may be configured to input the semantic vector of the feature information of the object to a predetermined classifier, to obtain an initial category of the object after the object is classified.

In a first possible implementation manner of the embodiment shown in FIG. 4, the apparatus for classifying an object based on a social networking service may further include a first determining module 408, a formation module 410, a construction module 412, and a clustering module 414.

The first determining module 408 may be configured to determine, for each object by using a semantic vector of feature information of the object, a predetermined number of similar objects corresponding to the object.

The formation module 410 may be configured to form an object pair by using the object and each of the similar objects.

The construction module 412 may be configured to construct a bipartite graph by using the object pair formed by the formation module 410 and a correspondence between a group and each user in the group.

The clustering module 414 may be configured to cluster an object in the bipartite graph by using a topic modeling algorithm.

The bipartite graph at least includes a correspondence formed by a first element and a second element; and when the first element in the correspondence is a group, the second element is a user in the group or a group that is in a same object pair of the group; or, when the first element in the correspondence is a user, the second element is a user that is in a same object pair of the user.

In a second possible implementation manner of the embodiment shown in FIG. 4, the apparatus for classifying an object based on a social networking service may further include a computation module 416, a second determining module 418, and a third determining module 420.

The computation module 416 may be configured to compute the number of objects that belong to a same initial category after the clustering.

The second determining module 418 may be configured to determine an initial category having the greatest number, computed by the computation module 416, of objects as a spread category.

The third determining module 420 may be configured to determine categories of the other objects after the clustering as the spread category.

In a third possible implementation manner of the embodiment shown in FIG. 4, the first determining module 408 may include a computation unit 408a, a sequencing unit 408b, and a determining unit 408c.

The computation unit 408a may be configured to compute a similarity between the object and an object having a same type by using semantic vectors of feature information of the objects.

The sequencing unit 408b may be configured to sequence the objects having the same type in a descending order according to the similarity computed by the computation unit 408a.

The determining unit 408c may be configured to select a predetermined number of objects from the objects having the same type after the sequencing, and determine the selected predetermined number of objects as similar objects of the object.

In a fourth possible implementation manner of the embodiment shown in FIG. 4, the computation unit 408a may include a computation subunit 408a1 and a determining subunit 408a2.

The computation subunit 408a1 may be configured to compute a cosine value between the semantic vector of the object and the semantic vector of the object having the same type.

The determining subunit 408a2 may be configured to determine the cosine value, computed by the computation subunit 408a1, as the similarity.

In a fifth possible implementation manner of the embodiment shown in FIG. 4, the apparatus for classifying an object based on a social networking service may further include a second acquisition module 422 and a categorizing module 424.

The second acquisition module 422 may be configured to acquire a confidence value that is determined when the predetermined classifier classifies the object.

The categorizing module 424 may be configured to: when the confidence value is greater than a predetermined confidence threshold, categorize the object corresponding to the confidence value as a type determined by the classifier.

In a sixth possible implementation manner of the embodiment shown in FIG. 4, the first determining module 404 may include a statistics collecting unit 404a, a solution unit 404b, and an addition unit 404c.

The statistics collecting unit 404a may be configured to: by using a pre-stored corpus, collect statistics on a probability that a segmented word exists behind a predetermined number of specified segmented words, the segmented word and the predetermined number of specified segmented words forming feature information.

The solution unit 404b may be configured to solve a predetermined mathematical model by using a back propagation learning algorithm, to obtain a semantic vector of each segmented word in the feature information.

The addition unit 404c may be configured to perform normalization after the semantic vectors of the segmented words in the same feature information are added, to obtain the semantic vector of the feature information.

In a seventh possible implementation manner of the embodiment shown in FIG. 4, the predetermined mathematics module may be:

$$y = \text{softmax}(U \cdot \tan h(Hx+d) + Wx + b),$$

where, y is a matrix formed by probabilities that the segmented word exists in pieces of feature information, x is a vector obtained by connecting semantic vectors of a predetermined number of specified segmented words in each piece of feature information in a head-to-tail manner, d and b are offset items, tan h and softmax are activation functions, U is a parameter from a hidden layer to an output layer of the predetermined mathematical model, and W is linear transformation from an input layer to the output layer of the predetermined mathematical model.

It should be noted that: when the apparatus for classifying an object based on a social networking service provided by the foregoing embodiments classifies an object, it is illustrated with an example of division of each function module. In a practical application, the function distribution may be finished by different function modules according to the requirements, that is, divide the internal structure of a computing device needing to perform classification into different function modules, so as to finish all or part of the functions described above. In this embodiment, the computing device needing to perform classification may be a device such as a server, a telephone, a personal computer, a palmtop computer, or the like. The functional modules are stored in a storage apparatus of the computing device in a form of a program instruction or a program module, and are executed by one or more processors in the computing device, so as to classify an object based on a social networking service.

Besides, the apparatus for classifying an object based on a social networking service provided in the foregoing embodiments and the embodiments of the method for classifying an object based on a social networking service belong to one concept. For a specific implementation process, refer to the method embodiment, and no further details are provided herein.

The sequence numbers of the foregoing embodiments of the present invention are merely for the convenience of description, and do not imply the preference among the embodiments.

A person of ordinary skill in the art may understand that all or a part of the steps of the foregoing embodiments may be implemented by using hardware, or may be implemented by a program instructing relevant hardware. The program may be stored in a computer readable storage medium. The storage medium may be a read-only memory, a magnetic disk, or an optical disc.

The foregoing descriptions are merely preferred embodiments, and are not intended to limit the present invention. Any modification, equivalent replacement, or improvement made within the spirit and principle of the present invention shall all fall within the protection scope of the present invention.

What is claimed is:

1. A method for classifying an object based on a social networking service, the method being run in a computing device, and the computing device comprising a storage apparatus, one or more processors, and program instructions stored in the storage apparatus and executed by the one or more processors, the method comprising:

acquiring feature information of an object, the feature information comprising multiple segmented words;

computing a semantic vector of the feature information, the semantic vector being used to reflect a relevancy feature when the segmented words exist in the feature information simultaneously;

inputting the semantic vector of the feature information of the object to a predetermined classifier, to obtain an initial category of the object after the object is classified;

wherein the object comprises a user and/or a group, and after the computing a semantic vector of the feature information, the method comprises:

determining, for each object by using a semantic vector of feature information of the object, a predetermined number of similar objects corresponding to the object;

forming an object pair by using the object and each of the similar objects;

constructing a bipartite graph by using the object pair and a correspondence between a group and each user in the group; and clustering an object in the bipartite graph by using a topic modeling algorithm, wherein the bipartite graph at least comprises a correspondence formed by a first element and a second element; and when the first element in the correspondence is a group, the second element is a user in the group or a group that is in a same object pair of the group; or, when the first element in the correspondence is a user, the second element is a user that is in a same object pair of the user.

2. The method according to claim 1, wherein after the clustering an object in the bipartite graph by using a topic modeling algorithm, the method further comprises:

computing the number of objects that belong to a same initial category after the clustering;

determining an initial category having the largest number of objects as a spread category; and determining categories of the other objects after the clustering as the spread category.

3. The method according to claim 1, wherein the determining, for each object by using a semantic vector of feature information of the object, a predetermined number of similar objects corresponding to the object comprises:

computing a similarity between the object and an object having a same type by using semantic vectors of feature information of the objects;

sequencing the objects having the same type in a descending order according to the similarity; and sequentially selecting a predetermined number of objects from the objects having the same type after the sequencing, and determining the selected predetermined number of objects as similar objects of the object, wherein the same type refers to that, when the object is a user, an object having a type the same as the type of the object is a user; and when the object is a group, an object having a type the same as the type of the object is a group.

4. The method according to claim 3, wherein the computing a similarity between the object and an object having a same type by using semantic vectors of feature information of the objects comprises:

computing a cosine value between the semantic vector of the object and the semantic vector of the object having the same type; and determining the cosine value as the similarity.

5. The method according to claim 1, wherein after the inputting the semantic vector of the feature information of the object to a predetermined classifier, to obtain an initial category of the object after the object is classified, the method further comprises:

acquiring a confidence value that is determined when the predetermined classifier classifies the object; and when the confidence value is greater than a predetermined confidence threshold, categorizing the object corresponding to the confidence value as a type determined by the predetermined classifier.

6. The method according to claim 1, wherein the computing a semantic vector of the feature information comprises:

by using a pre-stored corpus, collecting statistics on a probability that a segmented word exists behind a predetermined number of specified segmented words, the segmented word and the predetermined number of specified segmented words forming feature information;

solving a predetermined mathematical model by using a back propagation learning algorithm, to obtain a semantic vector of each segmented word in the feature information; and performing normalization after the semantic vectors of the segmented words in the same feature information are added, to obtain the semantic vector of the feature information.

7. The method according to claim 6, wherein the predetermined mathematical model is:

$$y = \text{softmax}(U \cdot \tan h(Hx+d)+Wx+b),$$

wherein, y is a matrix formed by probabilities that the segmented word exists in pieces of feature information, x is a vector obtained by connecting semantic vectors of a predetermined number of specified segmented words in each piece of feature information in a head-to-tail manner, d and b are offset items, tan h and softmax are activation functions, U is a parameter from a hidden layer to an output layer of the predetermined mathematical model, and W is linear transformation from an input layer to the output layer of the predetermined mathematical model.

8. An apparatus for classifying an object based on a social networking service, comprising:

a storage apparatus;

one or more processors; and one or more program modules, stored in the storage apparatus and executed by the one or more processors, the one or more program modules comprising:

a first acquisition module, configured to acquire feature information of an object, the feature information comprising multiple segmented words;

a logical operation module, configured to compute a semantic vector of the feature information, the semantic vector being used to reflect a relevancy feature when the segmented words exist in the feature information simultaneously;

a classifying module, configured to input the semantic vector of the feature information of the object to a predetermined classifier, to obtain an initial category of the object after the object is classified;

a first determining module, configured to determine, for each object by using a semantic vector of feature information of the object, a predetermined number of similar objects corresponding to the object;

a formation module, configured to form an object pair by using the object and each of the similar objects;

a construction module, configured to construct a bipartite graph by using the object pair formed by the formation module and a correspondence between a group and each user in the group; and a clustering module, configured to cluster an object in the bipartite graph by using a topic modeling algorithm, wherein the bipartite graph at least comprises a correspondence formed by a first element and a second element; and when the first element in the correspondence is a group, the second element is a user in the group or a group that is in a same object pair of the group; or, when the first element in the correspondence is a user, the second element is a user that is in a same object pair of the user.

9. The apparatus according to claim 8, further comprising:

a computation module, configured to compute the number of objects that belong to a same initial category after the clustering;

a second determining module, configured to determine an initial category having the greatest number, computed by the computation module, of objects as a spread category; and a third determining module, configured to determine categories of the other objects after the clustering as the spread category.

10. The apparatus according to claim 8, wherein the first determining module comprises:

a computation unit, configured to compute a similarity between the object and an object having a same type by using semantic vectors of feature information of the objects;

a sequencing unit, configured to sequence the objects having the same type in a descending order according to the similarity computed by the computation unit; and a determining unit, configured to sequentially select a predetermined number of objects from the objects having the same type after the sequencing, and determine the selected predetermined number of objects as similar objects of the object, wherein the same type refers to that, when the object is a user, an object having a type the same as the type of the object is a user; and when the object is a group, an object having a type the same as the type of the object is a group.

11. The apparatus according to claim 10, wherein the computation unit comprises:

a computation subunit, configured to compute a cosine value between the semantic vector of the object and the semantic vector of the object having the same type; and a determining subunit, configured to determine the cosine value computed by the computation subunit as the similarity.

12. The apparatus according to claim 8, further comprising:
a second acquisition module, configured to acquire a confidence value that is determined when the predetermined classifier classifies the object; and
a categorizing module, configured to: when the confidence value is greater than a predetermined confidence threshold, categorize the object corresponding to the confidence value as a type determined by the predetermined classifier.

13. The apparatus according to claim 8, wherein the logical operation module comprises:
a statistics collecting unit, configured to: by using a pre-stored corpus, collect statistics on a probability that a segmented word exists behind a predetermined number of specified segmented words, the segmented word and the predetermined number of specified segmented words forming feature information;
a solution unit, configured to solve a predetermined mathematical model by using a back propagation learning algorithm, to obtain a semantic vector of each segmented word in the feature information; and
an addition unit, configured to perform normalization after the semantic vectors of the segmented words in the same feature information are added, to obtain the semantic vector of the feature information.

14. The apparatus according to claim 13, wherein the predetermined mathematical model is:

$$y = \mathrm{softmax}(U \cdot \tan h(Hx+d)+Wx+b),$$

wherein, y is a matrix formed by probabilities that the segmented word exists in pieces of feature information, x is a vector obtained by connecting semantic vectors of a predetermined number of specified segmented words in each piece of feature information in a head-to-tail manner, d and b are offset items, tank and softmax are activation functions, U is a parameter from a hidden layer to an output layer of the predetermined mathematical model, and W is linear transformation from an input layer to the output layer of the predetermined mathematical model.

15. A non-transitory computer readable storage medium, storing a program instruction executable by a computing device, and when the executable instructions are run in the computing device, a method for classifying an object based on a social networking service being executed, the method comprising:
acquiring feature information of an object, the feature information comprising multiple segmented words;
computing a semantic vector of the feature information, the semantic vector being used to reflect a relevancy feature when the segmented words exist in the feature information simultaneously; and
inputting the semantic vector of the feature information of the object to a predetermined classifier, to obtain an initial category of the object after the object is classified;
wherein the object comprises a user and/or a group, and after the computing a semantic vector of the feature information, the method comprises:
determining, for each object by using a semantic vector of feature information of the object, a predetermined number of similar objects corresponding to the object;
forming an object pair by using the object and each of the similar objects;
constructing a bipartite graph by using the object pair and a correspondence between a group and each user in the group; and
clustering an object in the bipartite graph by using a topic modeling algorithm, wherein
the bipartite graph at least comprises a correspondence formed by a first element and a second element; and when the first element in the correspondence is a group, the second element is a user in the group or a group that is in a same object pair of the group; or, when the first element in the correspondence is a user, the second element is a user that is in a same object pair of the user.

* * * * *